United States Patent
Kail et al.

(10) Patent No.: US 10,513,465 B2
(45) Date of Patent: Dec. 24, 2019

(54) METHOD FOR PRODUCING GRANULATED NITROGEN-POTASH FERTILIZER

(71) Applicant: Mineral and Chemical Company Eurochem, Joint Stock Company, Moscow (RU)

(72) Inventors: Viktor Yakovlevich Kail, Khutor Progress Stavropolskii krai (RU); Alexandr Mikhailovich Novoselov, Stavropolskii krai (RU); Vyacheslav Mikhailovich Ovchinnikov, Stavropolskii krai (RU); Oleg Anatolievich Shirobokov, Stavropolsky krai (RU); Vladimir Borisovich Makeev, Stavropolsky krai (RU); Inna Anatolevna Shilova, Stavropolsky krai (RU)

(73) Assignee: Mineral and Chemical Company Eurochem, Joint Stock Company, Moscow (RU)

(*) Notice: Subject to any disclaimer, the term of this patent is extended or adjusted under 35 U.S.C. 154(b) by 0 days.

(21) Appl. No.: 14/903,884

(22) PCT Filed: Jun. 17, 2014

(86) PCT No.: PCT/RU2014/000436
§ 371 (c)(1),
(2) Date: Jan. 8, 2016

(87) PCT Pub. No.: WO2015/005824
PCT Pub. Date: Jan. 15, 2015

(65) Prior Publication Data
US 2016/0145161 A1    May 26, 2016

(30) Foreign Application Priority Data

Jul. 11, 2013  (RU) ................. 2013132122

(51) Int. Cl.
*C05C 1/02* (2006.01)
(52) U.S. Cl.
CPC ..................... *C05C 1/02* (2013.01)
(58) Field of Classification Search
CPC .......... C05C 1/02; C05F 11/10; C05G 3/0058
See application file for complete search history.

(56) References Cited

U.S. PATENT DOCUMENTS

| 3,070,435 A | * | 12/1962 | Reusser ................. B01J 2/30 252/385 |
| 5,154,752 A | * | 10/1992 | Scheibler ............... B01J 2/28 423/396 |
| 7,744,672 B2 | | 6/2010 | Kanonov et al. |
| 2003/0015009 A1 | | 1/2003 | Dukhanin et al. |

FOREIGN PATENT DOCUMENTS

| RU | 2154620 C1 | 8/2000 |
| RU | 2225384 C1 | 3/2004 |
| RU | 2240295 C1 | 11/2004 |
| RU | 2275347 C1 | 4/2006 |
| RU | 2315740 C2 * | 1/2008 |

OTHER PUBLICATIONS

English Translation of RU 2240295C1 to Serebryakov Nov. 20, 2004.*
International Search Report for corresponding application No. PCT/RU2014/000436.

* cited by examiner

*Primary Examiner* — Jennifer A Smith
(74) *Attorney, Agent, or Firm* — Wood, Phillips, Katz, Clark & Mortimer

(57) ABSTRACT

The invention can be applied in the chemical industry when producing complex mineral fertilizers using ammonium nitrate and potassium chloride. A method for producing granulated nitrogen-potash fertilizer is carried out by mixing a concentrated solution of ammonium nitrate with potassium chloride and ammonia, granulating the resulting mixture and drying the product. In the process of granulation, the resulting particulate product has, applied to same, an aqueous solution of magnesium sulfate having 24-30 percent concentration by mass, in an amount which allows for the magnesium sulfate contents in the finished product based on MgO to be no less than 0.5 percent by mass. The strength of the fertilizer granules is thus increased and the caking thereof during prolonged storage is decreased. In addition, by maintaining the MgO in the finished product at 0.5-1.0 percent by mass, a minimum consumption of magnesium sulfate is achieved.

2 Claims, No Drawings

US 10,513,465 B2

METHOD FOR PRODUCING GRANULATED NITROGEN-POTASH FERTILIZER

FIELD OF THE INVENTION

The invention relates to processes for producing nitrogen-potash fertilizers on the basis of ammonium nitrate and potassium chloride that are used in agriculture; the invention can be used in the chemical industry in the manufacture of mineral fertilizers.

BACKGROUND

A method for producing granulated nitrogen-potash fertilizer is known that comprises mixing a concentrated ammonium nitrate solution with potassium chloride, granulating the mixture with a magnesium salt, and drying the product (patent of the Russian Federation, RU 2225384 C1, IPC C05G1/00, C05C1/00, C05D1/00, published on 10 Mar. 2004). In the known method, the magnesium salt, which is magnesium nitrate, is added to the mixture or to the concentrated solution to reduce caking of the granulated product. However, caking of the product increases during its storage. Performance characteristics of the product (strength of granules and caking ability) are low since in the final product, processes of conversion of raw materials (conversion of ammonium nitrate and potassium chloride into potassium nitrate and ammonium chloride) continue to run.

Another known method for producing nitrogen-potash fertilizers comprises mixing an ammonium nitrate melt with potassium chloride, granulating the mixture comprising magnesium sulfate in a granulating drum, and drying the product (patent of the Russian Federation, RU 2154620 C1, IPC C05C1/02, C05D1/00, C05G1/06, C05D5/00, published on 20 Aug. 2000). The method for producing nitrogen-potash fertilizers on the basis of ammonium nitrate and potassium chloride is characterized by insufficient productivity due to frequent shutdown of the equipment for cleaning because of its plugging and clogging with the product. The granulated product produced by the known method has a low strength granules and a high caking ability; long-term storage provides the formation of adhered agglomerates; the content of a dust fraction increases during a long-term transportation because of crushing granules; and processes of conversion of raw materials (ammonium nitrate and potassium chloride) continue to run in the final product.

The closest prior art for the claimed invention is a method for producing granulated nitrogen-potash fertilizers, comprising mixing a concentrated ammonium nitrate solution with potassium chloride and ammonia, granulating the mixture in a granulating drum, and drying the product (patent of the Russian Federation, RU 2275347 C1, IPC C05C1/02, C05D1/00, C05G1/00, published on 27.04.2006 (prototype)). The known method is characterized by a high conversion degree of ammonium nitrate and potassium chloride into potassium nitrate and ammonium chloride, respectively, which provides high agrochemical properties of the produced granulated nitrogen-potash fertilizers. However, the product granules have insufficient strength, as a result of which a portion of fine-grained fraction increases during a long-term transportation, thereby increasing caking during a long-term storage.

DISCLOSURE OF THE INVENTION

The purpose of claimed method consists in providing granulated nitrogen-potash fertilizer on the basis of ammonium nitrate and potassium chloride of potash-ammonium saltpeter type. The main technical result of the invention consists in increasing the strength of the fertilizer granules and in decreasing its caking during a long-term storage.

The achievement of the main technical result is ensured in that at the step of granulation of the method for producing a granulated nitrogen-potash fertilizer, wherein the method comprises mixing a concentrated solution of ammonium nitrate with potassium chloride and ammonia, granulating the mixture, and drying the product, an aqueous solution of magnesium sulfate at a concentration of 24-30% by weight is applied on a produced dispersion product in an amount that provides the content of magnesium sulfate in the final product not less than 0.5 wt. % based on MgO. In addition, the content of MgO in the final product is maintained in the range 0.5 and 1.0 wt. %.

The proposed method allows a controlled structure formation of granules. For this purpose, magnesium sulfate is applied on a dispersion product resulted from granulation. Dispersion product consists of the product particles formed at initial steps of granulation when the recycle product comes in contact with the mixture (pulp, charge) obtained under stirring and conversion of ammonium nitrate and potassium chloride. The dispersion product preliminarily consists of already formed granules and granules under formation. The aqueous solution of magnesium sulfate, when falling on the surface of the particles of the dispersion product, causes structuring of the surface layers of the granules, improving their strength in further granulation and storage of the final product. This allows for more complete maintenance of the properties of magnesium sulfate serving as a structure-forming additive and a significant increase in the strength of the granules of the final product.

The weight fraction of magnesium sulfate in the aqueous solution is maintained at a concentration of between 24 and 30 wt. % (or 8 and 10 wt. % based on MgO) to optimize the energy consumption during the drying process and to provide rheological properties of the solution required for its application. It has been found that the moisture content in granules increases when the amount of magnesium sulfate is less than 24 wt. % (8 wt. % based on MgO), which leads to increasing energy consumption of the drying process, while in the amount of magnesium sulfate in the solution of more than 30 wt. % (more than 10 wt. % based on MgO), the viscosity of the solution increases which makes it difficult its transportation and application.

The solution of magnesium sulfate is added in an amount providing its content in the final product of not less than 0.5 wt. % based on MgO. When the amount of MgO in the product is less than 0.5 wt. %, the strength of granules decreases down to levels inherent in the prototype, and caking of the fertilizer increases in a long-term storage of the final product. An increase in the content of MgO in the final product of more than 1 wt. % does not provide a significant increase in the strength of the fertilizer granules, compared to the range of 0.5 to 1.0 wt. % (0.5 to 1.0 wt. %, including the values of 0.5 and 1.0% (herein, the sign "–" is used in the same way to indicate the limits of the numerical values of both percentages and other variables)). During a long-term storage, the strength of the granules of fertilizer containing at least 0.5 wt. % magnesium sulfate, based on MgO, significantly increases, reaching the strength values of the granules two times higher than in the prototype, while maintaining extremely low caking. When the aqueous solution of magnesium sulfate is applied until its amount in the final product reaches 0.5 to 1.0 wt. % (based on MgO), magnesium sulfate is used efficiently (economically) (this is an additional technical result of the invention), i.e. when the final product comprises more than 1.0 wt. % of MgO, the consumption of magnesium sulfate in the flow process increases.

The addition of ammonia to the mixture accelerates the process of conversion of ammonium nitrate and potassium chloride and provides a fire explosion safety during the mixing and drying processes. The maintenance of the pH of the mixture in the range 6.5 and 7.5 under mixing ensures optimal action of ammonia. A risk of fire and explosion during the processes of mixing pulp and drying a high nitrogen fertilizer (containing sodium and potassium nitrates) increases at a pH value of less than 6.0, but at a pH value of more than 8.0, the loss of ammonia under drying increases.

The claimed method provides nitrogen-potash fertilizers of various grades with the total content of nitrogen (N) of from 15 to 22 wt. % and potassium ($K_2O$) of from 17 to 32 wt. %.

The invention is carried out as follows. The process of mixing is performed in a reactor-neutralizer loaded with ammonium nitrate in the form of a concentrated solution, including in the form of a melt, in an amount of 33 to 69 wt. %, wherein the weight fraction of $NH_4NO_3$ is 80 to 96%, and potassium chloride in an amount of 22 to 65 wt. %, and gaseous ammonia is simultaneously added in the amount ensuring the pH of the mixture in the range 6.0 to 8.0. The mixture is stirred at temperature of 80 to 130° C. for 45-60 minutes, while adding water and absorptive wastes which are an aqueous fertilizer solution, to maintain the moisture of the mixture in the range 5 to 20 wt. %. The mixture is supplied for granulation through a nozzle to a GDD or AG apparatus where an aqueous solution of magnesium sulfate is added in a separate stream at a concentration of 24 to 30 wt. %. The solution of magnesium sulfate is sprayed on the dispersion product.

The obtained granules of the product are dried, cooled and subjected to sorting. The product whose granules are more than 4 mm is crushed and is returned together with the product with granules of less than 1 mm to the granulation process as a recycle product. The consumption of the aqueous magnesium sulfate in the granulator is set so as to provide the content of MgO in the final product in the range 0.5 to 1.0 wt. %. The actual content of magnesium sulfate or MgO in the product is checked in the final product.

The aqueous magnesium sulfate is prepared in the reactor from a diluted sulfuric acid and magnesium-containing raw material (magnesite caustic powder, etc.) according to the following reaction:

$$MgO + H_2SO_4 = MgSO_4 + H_2O \qquad (1)$$

The claimed method is used in the manufacture of nitrogen-potash fertilizers by workflows where a granulating drum-dryer (GDD) or spherodizer or an ammonizator-granulator (AG) is used.

EMBODIMENTS OF THE INVENTION

The industrial applicability of the invention is supported by examples carried out under conditions of pilot production.

Example 1. Fertilizer Grade NK 17:28 was Prepared According to the Invention

A mixing unit was loaded with an 80 wt. % solution of ammonium nitrate at a rate of 23.1 t/h (48 wt. % ammonium nitrate), potassium chloride at a rate of 18 t/h (46 wt. %), and gaseous ammonia. The mixture was stirred for 60 minutes at 100° C.; the pH of the mixture was maintained at 6.0 by supplying ammonia (at a rate of 0.2 t/h). The obtained mixture was delivered to an AG-type granulating drum (length of 8 m, diameter of 4 m), and the process of granulation was performed at a drum speed of 9 rpm. The mixture was sprayed on recycle product. Then an aqueous solution of magnesium sulfate at a concentration of 24% by weight (8 wt. % based on MgO) was sprayed on the dispersion product obtained after granulation at a distance of 3.2 m from the center of spraying mixture. The product output from the granulator was dried by flue gases, cooled, and subjected to sorting. The rate of the aqueous magnesium sulfate to be sprayed was set so as to reach 0.5 wt. % of magnesium sulfate in the final product, based on MgO. The mixture was prepared from commercial-grade potassium chloride (GOST 4568-95) and ammonium nitrate prepared by ammonization of nitric acid. The magnesium sulfate solution for spraying was prepared according to reaction (1).

The yield of nitrogen-potash fertilizer was 38 t/h, the fertilizer comprising 17 wt. % of N, 28 wt. % of $K_2O$, 0.5 wt. % of MgO, and 0.8 wt. % of $H_2O$. After sorting, the yield of the applicable fractions of the product with a size of 1-4 mm was 95%; caking of the fertilizer was 0%; and the strength of the granules was 64 kgf/cm$^2$ (6,276,256 N/m$^2$). After six-month storage, caking of the fertilizer was 0%, and the strength of the granules was 100 kgf/cm$^2$ (9,806,650 N/m$^2$).

Example 2. Fertilizer Grade NK 17:28 was Prepared According to the Invention

A mixing unit was loaded with 96 wt. % ammonium nitrate melt at a rate of 19.3 t/h (48 wt. % ammonium nitrate), potassium chloride at a rate of 18 t/h (46 wt. %), and gaseous ammonia. The mixture was stirred for 50 minutes at 100° C.; the pH of the mixture was maintained to be equal to 7.0 by supplying ammonia (at a rate of 0.3 t/h). The obtained mixture was delivered to an AG-type granulating drum. Further, the example was carried out similarly to example 1. A difference from example 1 consisted in that a 27 wt. % aqueous magnesium sulfate (9.0 wt. % based on MgO) was sprayed on the dispersion product to reach the concentration of MgO in the final product of 0.7 wt. %.

The yield of nitrogen-potash fertilizer was 38 t/h, the fertilizer comprising 17 wt. % of N, 28 wt. % of $K_2O$, 0.7 wt. % of MgO, and 0.8 wt. % of $H_2O$. After sorting, the yield of the applicable fractions of the product with a size of 1-4 mm was 95%; caking of the fertilizer was 0%; and the strength of the granules was 79 kgf/cm$^2$ (7,747,253.5 N/m$^2$). After six-month storage, caking of the fertilizer was 0%, and the strength of granules was 100 kgf/cm$^2$ (9,806,650 N/m$^2$).

Example 3. Fertilizer Grade NK 17:28 was Prepared According to the Invention

A mixing unit was loaded with a 96 wt. % ammonium nitrate melt at a rate of 19.3 t/h (48 wt. % ammonium nitrate), potassium chloride at a rate of 18 t/h (46 wt. %), and gaseous ammonia. The mixture was stirred for 45 minutes at 100° C.; the pH of the mixture was maintained to be equal to 8.0 by supplying ammonia (at a rate of 0.4 t/h).

The obtained mixture was delivered to an AG-type granulating drum. Further, the example was carried out similarly to example 1. A difference from example 1 consisted in that a 30 wt. % aqueous magnesium sulfate (10.0 wt. % based on MgO) was sprayed on the dispersion product to reach the concentration of MgO in the final product of 0.8 wt. %.

The yield of nitrogen-potash fertilizer was 38 t/h, the fertilizer comprising 17 wt. % of N, 28 wt. % of $K_2O$, 0.8 wt. % of MgO, and 0.8 wt. % of $H_2O$. After sorting, the yield of the applicable fractions of the product with a size of 1-4 mm was 95%; caking of the fertilizer was 0%; and the strength of the granules was 90 kgf/cm$^2$ (8,825,985 N/m$^2$). After six-month storage, caking of the fertilizer was 0%, and the strength of granules was 100 kgf/cm$^2$ (9,806,650 N/m$^2$).

Example 4. Fertilizer Grade NK 17:28 was Prepared According to the Invention

A mixing unit was loaded with a 96 wt. % ammonium nitrate melt at a rate of 19.3 t/h (48 wt. % ammonium nitrate), potassium chloride at a rate of 18 t/h (46 wt. %), and gaseous ammonia. The mixture was stirred for 50 minutes at 100° C.; the pH of the mixture was maintained to be equal to 7.0 by supplying ammonia (at a rate of 0.3 t/h). The obtained mixture was delivered to an AG-type granulating drum. Further, the example was carried out similarly to example 1. A difference from example 1 consisted in that a 30 wt. % aqueous magnesium sulfate (10.0 wt. % based on MgO) was sprayed on the dispersion product to reach the concentration of MgO in the final product of 1.0 wt. %.

The yield of nitrogen-potash fertilizer was 38 t/h, the fertilizer comprising 17 wt. % of N, 28 wt. % of $K_2O$, 1.0 wt. % of MgO, and 0.8 wt. % of $H_2O$. After sorting, the yield of the applicable fractions of the product with a size of 1-4 mm was 95%; caking of the fertilizer was 0%; and the strength of the granules was 91 kgf/cm$^2$ (8,924,051.5 N/m$^2$). After six-month storage, caking of the fertilizer was 0%, and the strength of granules was 100 kgf/cm$^2$ (9,806,650 N/m$^2$).

Example 5. Fertilizer Grade NK 21:21 was Prepared According to the Invention

A mixing unit was loaded with a 96 wt. % ammonium nitrate melt at a rate of 19.6 t/h (61 wt. % ammonium nitrate), potassium chloride at a rate of 11 t/h (35 wt. %), and gaseous ammonia. The mixture was stirred for 50 minutes at 100° C.; the pH of the mixture was maintained to be equal 7.0 by supplying ammonia (at a rate of 0.6 t/h). The obtained mixture was delivered to an AG-type granulating drum. Further, the example was carried out similarly to example 1.

The yield of nitrogen-potash fertilizer was 31 t/h, the fertilizer comprising 21 wt. % of N, 21 wt. % of $K_2O$, 0.5 wt. % of MgO, and 0.7 wt. % of $H_2O$. After sorting, the yield of the applicable fractions of the product with a size of 1-4 mm was 96%; caking of the fertilizer was 0%; and the strength of the granules was 66 kgf/cm$^2$ (6,472,389 N/m$^2$). After six-month storage, caking of the fertilizer was 0%, and the strength of the granules was 100 kgf/cm$^2$ (9,806,650 N/m$^2$).

Example 6. Fertilizer Grade NK 21:21 was Prepared According to the Invention

A mixing unit was loaded with 96 wt. % ammonium nitrate melt at a rate of 19.6 t/h (61 wt. % ammonium nitrate), potassium chloride in an amount of 11 t/h (35 wt. %), and gaseous ammonia. The mixture was stirred for 50 minutes at 100° C.; the pH of the mixture was maintained at 7.0 by supplying ammonia (at a rate of 0.6 t/h). The obtained mixture was delivered to an AG-type granulating drum. Further, the example was carried out similarly to example 1. A difference from example 1 consisted in that a 24 wt. % aqueous magnesium sulfate (8 wt. % based on MgO) was sprayed on the dispersion product to reach the concentration of magnesium sulfate in the final product of 1.0 wt. %, based on MgO.

The yield of nitrogen-potash fertilizer was 31 t/h, the fertilizer comprising 21 wt. % of N, 21 wt. % of $K_2O$, 1.0 wt. % of MgO, and 0.9 wt. % of $H_2O$. After sorting, the yield of the applicable fractions of the product with a size of 1-4 mm was 96%; caking of the fertilizer was 0%; and the strength of the granules was 93 kgf/cm$^2$ (9,120,184.5 N/m$^2$). After six-month storage, caking of the fertilizer was 0%, and the strength of granules was 100 kgf/cm$^2$ (9,806,650 N/m$^2$).

Example 7. Fertilizer Grade NK 17:28 was Prepared According to the Invention

A mixing unit was loaded with an 80 wt. % concentrated solution of ammonium nitrate at a rate of 21 t/h (48 wt. % ammonium nitrate), potassium chloride at a rate of 16.3 t/h (46 wt. %), and gaseous ammonia. The mixture was stirred for 60 minutes at 100° C.; the pH of the mixture was maintained to be equal 7.0 by supplying ammonia (at a rate of 0.3 t/h). The obtained mixture was delivered to a granulating drum-dryer. The mixture was sprayed on the curtain of recycle product. A 24 wt. % magnesium sulfate solution (8 wt. % based on MgO) was sprayed on the mixture of the recycle product formed after spraying. The product output from the GDD apparatus was cooled and subjected to sorting. The mixture was prepared from commercial-grade potassium chloride (GOST 4568-95) and ammonium nitrate prepared by ammonization of nitric acid. In spraying, the aqueous magnesium sulfate was used that had been prepared according to reaction (1). During spraying of magnesium sulfate, the content of MgO in the final granulated product was controlled by supplying the magnesium sulfate solution until reaching the MgO content of 0.5 wt. %.

The produced nitrogen-potash fertilizer comprised 17 wt. % of N, 28 wt. % of $K_2O$, 0.5 wt. % of MgO, and 1 wt. % of $H_2O$. After sorting, the yield of the applicable fractions of the product with a size of 1-4 mm was 35 t/h; caking of the fertilizer was 0%; and the strength of the granules was 47 kgf/cm$^2$ (4,609,125.5 N/m$^2$). After six-month storage, caking of the fertilizer was 0%, and the strength of granules was 100 kgf/cm$^2$ (9,806,650 N/m$^2$).

Example 8. Fertilizer Grade NK 17:28 was Prepared According to the Invention

This example was carried out similarly to example 7. A difference from example 7 consisted in that a 27 wt. % aqueous magnesium sulfate (9 wt. % based on MgO) was sprayed on the dispersion product formed after spraying the mixture on recycle product until reaching the MgO content in the final product of 0.8 wt. %.

The produced nitrogen-potash fertilizer comprised 17 wt. % of N, 28 wt. % of $K_2O$, 0.8 wt. % of MgO, and 0.8 wt. % of $H_2O$. After sorting, the yield of the applicable fractions of the product with a size of 1-4 mm was 35 t/h; caking of the fertilizer was 0%; and the strength of the granules was 87 kgf/cm$^2$ (8,531,785.5 N/m$^2$). After six-month storage, caking of the fertilizer was 0%, and the strength of granules was 100 kgf/cm$^2$ (9,806,650 N/m$^2$).

Example 9. Fertilizer Grade NK 17:28 was Prepared According to the Invention

This example was carried out similarly to example 7. A difference from example 7 consisted in that a 30 wt. % magnesium sulfate solution (10 wt. % based on MgO) was sprayed on the dispersion product obtained by spraying the mixture on recycle product until reaching the MgO content in the final product of 1.0 wt. %.

The produced nitrogen-potash fertilizer comprised 17 wt. % of N, 28 wt. % of $K_2O$, 1.0 wt. % of MgO, and 0.7 wt. % of $H_2O$. After sorting, the yield of the applicable fractions of the product with a size of 1-4 mm was 35 t/h; caking of the fertilizer was 0%; and the strength of the granules was 88 kgf/cm$^2$ (8,629,852 N/m$^2$). After six-month storage, caking of the fertilizer was 0%, and the strength of granules was 100 kgf/cm$^2$ (9,806,650 N/m$^2$).

Example 10. Fertilizer Grade NK 21:21 was Prepared According to the Invention

A mixing unit was loaded with a 96 wt. % ammonium nitrate melt at a rate of 18.6 t/h (60 wt. % ammonium nitrate), potassium chloride at a rate of 11 t/h (35 wt. %), and gaseous ammonia. The mixture was stirred for 60 minutes at 110° C.; the pH of the mixture was maintained at to 7.0 by supplying ammonia (at a rate of 0.4 t/h). The obtained mixture was delivered to a granulating drum-dryer. The mixture was sprayed on the curtain of recycle product. A 27 wt. % solution of magnesium sulfate (9 wt. % based on MgO) was sprayed through the GDD nozzle on the dispersion product obtained by spraying the mixture on the recycle product. During spraying of magnesium sulfate, the content of MgO in the final granulated product was controlled by supplying the magnesium sulfate solution until reaching the MgO content of 0.5 wt %.

The mixture was prepared from commercial-grade potassium chloride (GOST 4568-95) and ammonium nitrate prepared by ammonization of nitric acid. In spraying, the aqueous magnesium sulfate was used that had been prepared according to reaction (1).

The produced nitrogen-potash fertilizer comprised 21 wt. % of N, 21 wt. % of $K_2O$, 0.5 wt. % of magnesium sulfate (based on MgO), and 0.7 wt. % of $H_2O$. After sorting, the yield of the applicable fractions of the product with a size of 1-4 mm was 30%; caking of the fertilizer was 0%; and the strength of the granules was 56 kgf/cm$^2$ (5,491,724 N/m$^2$). After six-month storage, caking of the fertilizer was 0%, and the strength of granules was 100 kgf/cm$^2$ (9,806,650 N/m$^2$).

Example 11. Fertilizer Grade NK 21:21 was Prepared According to the Invention

This example was carried out similarly to example 10. A difference consisted in that the solution of magnesium sulfate was sprayed on the dispersion product until reaching the MgO content in the final product of 0.8 wt. %.

The produced nitrogen-potash fertilizer comprised 21 wt. % of N, 21 wt. % of $K_2O$, 0.8 wt. % of magnesium sulfate (based on MgO), and 0.9 wt. % $H_2O$. After sorting, the yield of the product with a size of 1-4 mm was 30 t/h; caking of the fertilizer was 0%; and the strength of the granules was 91 kgf/cm$^2$ (8,924,051.5 N/m$^2$). After six-month storage, caking of the fertilizer was 0%, and the strength of granules was 100 kgf/cm$^2$ (9,806,650 N/m$^2$).

Example 12. Fertilizer Grade NK 21:21 was Prepared According to the Invention

This example was carried out similarly to example 10. A difference consisted in that the solution of magnesium sulfate was sprayed on the dispersion product until reaching the MgO content in the final product of 1.0 wt. %.

The produced nitrogen-potash fertilizer comprised 21 wt. % of N, 21 wt. % of $K_2O$, 1.0 wt. % of magnesium sulfate (based on MgO), and 0.9 wt. % $H_2O$. After sorting, the yield of the product with a size of 1-4 mm was 30 t/h; caking of the fertilizer was 0%; and the strength of the granules was 93 kgf/cm$^2$ (9,120,184.5 N/m$^2$). After six-month storage, caking of the fertilizer was 0%, and the strength of granules was 100 kgf/cm$^2$ (9,806,650 N/m$^2$).

INDUSTRIAL APPLICABILITY

The invention can be used in plants for producing mineral fertilizers to manufacture nitrogen-potash fertilizers.

The invention claimed is:

1. A method for producing a granulated nitrogen-potash fertilizer, comprising mixing a concentrated ammonium nitrate solution with potassium chloride and ammonia, granulating the mixture, and drying a product, characterized in that at the step of granulation, an aqueous solution of magnesium sulfate at a concentration of 24-30% by weight is applied on a produced dispersion product in an amount that provides the content of magnesium sulfate in a final product not less than 0.5 wt. % based on MgO.

2. The method for producing according to claim 1, characterized in that the content of MgO in the final product is maintained between 0.5 to 1.0 wt. %.

* * * * *